US012726791B2

(12) United States Patent
Kogawa et al.

(10) Patent No.: US 12,726,791 B2
(45) Date of Patent: Sep. 1, 2026

(54) MANAGEMENT DEVICE AND MANAGEMENT METHOD

(71) Applicant: SINTOKOGIO, LTD., Nagoya (JP)

(72) Inventors: Akifumi Kogawa, Nagoya (JP); Masataka Shiraki, Nagoya (JP); Masahiko Nagasaka, Nagoya (JP)

(73) Assignee: SINTOKOGIO, LTD., Aichi (JP)

(*) Notice: Subject to any disclaimer, the term of this patent is extended or adjusted under 35 U.S.C. 154(b) by 335 days.

(21) Appl. No.: 18/481,643

(22) Filed: Oct. 5, 2023

(65) Prior Publication Data

US 2024/0129692 A1 Apr. 18, 2024

(30) Foreign Application Priority Data

Oct. 17, 2022 (JP) ................................ 2022-166203

(51) Int. Cl.
*H04W 4/029* (2018.01)
*G08B 21/04* (2006.01)

(52) U.S. Cl.
CPC ........ *H04W 4/029* (2018.02); *G08B 21/0446* (2013.01)

(58) Field of Classification Search
None
See application file for complete search history.

(56) References Cited

U.S. PATENT DOCUMENTS

| | | | | |
|---|---|---|---|---|
| 5,941,836 A * | 8/1999 | Friedman | G01C 9/10 | 600/595 |
| 6,100,806 A * | 8/2000 | Gaukel | G08B 21/0211 | 340/8.1 |
| 6,160,478 A * | 12/2000 | Jacobsen | A61B 5/6838 | 128/903 |
| 6,201,476 B1 * | 3/2001 | Depeursinge | G08B 21/0446 | 340/579 |
| 2007/0038155 A1 * | 2/2007 | Kelly, Jr. | A61B 5/1117 | 600/595 |
| 2023/0317273 A1 * | 10/2023 | Ishibashi | A61B 5/0022 | 705/2 |

FOREIGN PATENT DOCUMENTS

JP 2014-033745 A 2/2014

* cited by examiner

*Primary Examiner* — Adolf Dsouza
(74) *Attorney, Agent, or Firm* — Harness, Dickey & Pierce, P.L.C.

(57) ABSTRACT

In order to achieve a management device capable of managing the history of the location of a care-receiver, the management device includes a processor. The processor carries out a communication process of performing communication, via any of a plurality of relay terminals, with a sensor terminal which is worn by a care-receiver and which includes an excretion sensor and a determination process of determining a location of the care-receiver, based on a relay terminal which mediated the communication with the sensor terminal in the communication process.

8 Claims, 6 Drawing Sheets

MANAGEMENT DEVICE AND MANAGEMENT METHOD

This Nonprovisional application claims priority under 35 U.S.C. § 119 on Patent Application No. 2022-166203 filed in Japan on Oct. 17, 2022, the entire contents of which are hereby incorporated by reference.

TECHNICAL FIELD

The present invention relates to a management device and a management method, each of which manages care-receivers at a medical/nursing facility and the like.

BACKGROUND ART

In care services or medical services, excretion management for care-receivers is one of the important operations. If automatic detection of excretion of the care-receivers, including automatic detection of the type of the excretion, is possible, the burden of the excretion management on caregivers can be significantly reduced.

As a technique for detecting excretion of a care-receiver, for example, the technique disclosed in Patent Literature 1 is known. The technique disclosed in Patent Literature 1 determines, on the basis of an output signal from an odor sensor and an output signal from a humidity sensor, the type of excreta of a care-receiver and whether the leakage from a diaper of the care receiver occurs, and then notifies a caregiver of the degree of urgency of treatment for the excretion.

Citation List

Patent Literature

Patent Literature 1

Japanese Patent Application Publication, Tokukai, No. 2014-33745

SUMMARY OF INVENTION

Technical Problem

In a system to notify a caregiver of the excretion of a care-receiver, it is important to manage the location of the care-receiver. This is because, for example, the caregiver can attend to the excretion care more quickly if the caregiver can be notified of the location of the excretion of the care-receiver.

Examples of a possible method for managing the location of the care-receiver include a method in which a positioning device such as a global positioning system (GPS) device is mounted on a sensor terminal to be worn by the care-receiver. However, in such a case, an increase in the cost of the sensor terminal is unavoidable. In addition, in facilities where sensor terminals without positioning devices are already introduced, the sensor terminals need to be replaced. This makes it difficult to introduce sensor terminals with positioning devices.

An aspect of the present invention has been made in view of the above problems, and an object thereof is to achieve a management device or a management method, each of which makes it possible to manage the location of a care-receiver even when a positioning device is not mounted on a sensor terminal.

Solution to Problem

A management device in accordance with an aspect of the present invention includes a processor which carries out a communication process and a determination process. A management method in accordance with an aspect of the present invention includes a communication process and a determination process. The communication process is a process of performing, by the processor, communication, via any of a plurality of relay terminals, with a sensor terminal which is worn by a care-receiver and which includes an excretion sensor. The determination process is a process of determining the location of the care-receiver, based on a relay terminal which mediated the communication with the sensor terminal in the communication process.

Advantageous Effects of Invention

With an aspect of the present invention, it is possible to achieve a management device or a management method, each of which makes it possible to manage the location of a care-receiver even when a positioning device is not mounted on a sensor terminal.

DESCRIPTION OF EMBODIMENTS (Configuration of Management System)

Figure 1:
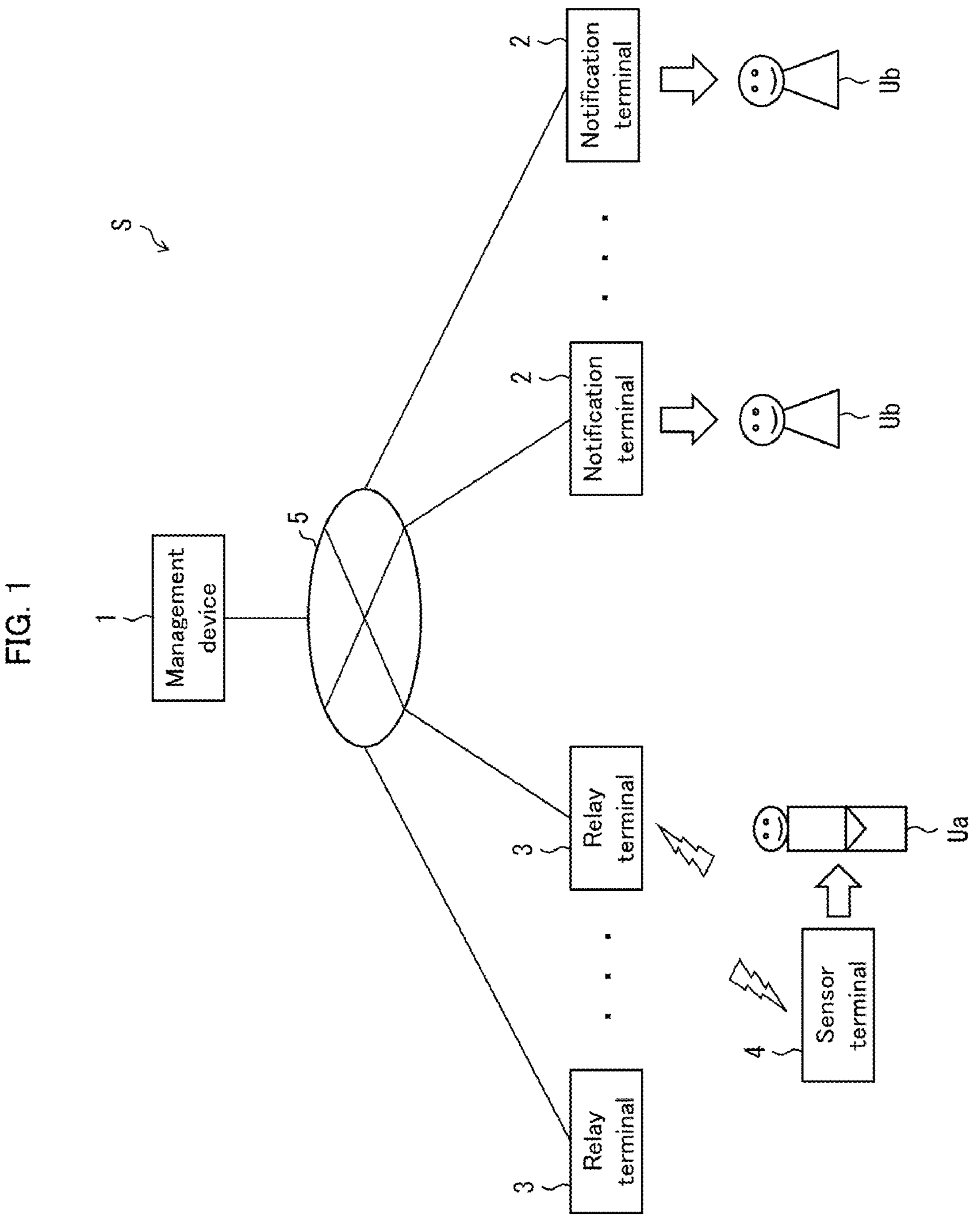
FIG. 1 is a view schematically illustrating a configuration of a management system in accordance with an embodiment of the present invention.

The following description will discuss a configuration of a management system S with reference to FIG. 1. FIG. 1 is a block diagram illustrating the configuration of the management system S.

The management system S is a system for performing the management of a care-receiver Ua at a facility, the purpose of which is to provide care services or medical services.

As illustrated in FIG. 1, the management system S includes a management device 1, at least one notification terminal 2, a plurality of relay terminals 3, and at least one sensor terminal 4. The notification terminal 2 and the relay terminal 3 are configured to be able to communicate with the management device 1 via a network 5. The sensor terminal 4 is configured to be able to communicate with the relay terminal 3 via short-range wireless communication such as Wi-Fi (registered trademark) or Bluetooth (registered trademark). The sensor terminal 4 selects, from among the plurality of relay terminals 3, a relay terminal 3 which exists in the vicinity of the sensor terminal 4, and uses the selected relay terminal 3 to communicate with the management device 1.

The sensor terminal 4 is worn by the care-receiver Ua. For example, the sensor terminal 4 is provided inside an undergarment (such as a diaper or underwear) of the care-receiver Ua. The sensor terminal 4 includes an excretion sensor and an acceleration sensor. When the excretion sensor has detected the excretion of the care-receiver Ua, the sensor terminal 4 transmits, to the management device 1 via the selected relay terminal 3, a signal which indicates that the excretion of the care-receiver Ua has been detected (this signal will be hereinafter also referred to as "excretion detection signal"). When the acceleration sensor has detected the fall of the care-receiver Ua, the sensor terminal 4 transmits, to the management device 1 via the selected relay terminal 3, a signal which indicates that the fall of the care-receiver Ua has been detected (this signal will be hereinafter also referred to as "fall detection signal"). In addition, the sensor terminal 4 can periodically (e.g., every minute) transmit, to the management device 1 via the selected relay terminal 3, a signal which instructs the generation of history information indicative of the location of the care-receiver Ua (this signal will be hereinafter referred to as "generation instruction signal"). It should be noted that the relay terminal 3 to be selected by the sensor terminal 4 is, as described above, a relay terminal 3 which exists in the vicinity of the sensor terminal 4, for example, a relay terminal 3 which has the highest radio wave intensity.

The relay terminals 3 are provided at a plurality of predetermined places in a facility at which the management system S is to be used. For example, the relay terminals 3 are respectively provided at a dining room, a day room, and a bathroom, where the care-receiver Ua highly frequently goes and stays for a long period of time. The installation places of the relay terminals 3 can be changed as appropriate, and it is also possible to increase the number of installation places. A relay terminal 3 mediates communication between the sensor terminal 4 and the management device 1. For example, when the relay terminal 3 has received an excretion detection signal from the sensor terminal 4, the relay terminal 3 transmits the excretion detection signal to the management device 1. In addition, when the relay terminal 3 has received a fall detection signal from the sensor terminal 4, the relay terminal 3 transmits the fall detection signal to the management device 1. In the present embodiment, the relay terminal 3 is a stationary type wireless relay device. Alternatively, it is possible to use a portable device such as a smartphone or a tablet as the relay terminal 3.

The management device 1 is provided outside the facility at which the management system S is used. For example, the management device 1 is provided at a data center. When the management device 1 has received the excretion detection signal from the relay terminal 3, the management device 1 transmits, to each notification terminal 2, an alert for notifying the caregiver Ub that the excretion sensor has detected the excretion of the care-receiver Ua (this alert will be hereinafter also referred to as "excretion alert"). When the management device 1 has received the fall detection signal from the relay terminal 3, the management device 1 transmits, to each notification terminal 2, an alert for notifying the caregiver Ub that the acceleration sensor has detected the fall of the care-receiver Ua (this alert will be hereinafter also referred to as "fall alert").

The notification terminal 2 is carried by the caregiver Ub. The notification terminal 2 includes a touch panel type display. When the notification terminal 2 has received the excretion alert from the management device 1, the notification terminal 2 displays, on the display, a screen which indicates that the excretion of the care-receiver Ua has been detected (this screen will be hereinafter also referred to as "excretion notification screen"). When the notification terminal 2 has received the fall alert from the management device 1, the notification terminal 2 displays, on the display, a screen which indicates that the fall of the care-receiver Ua has been detected (this screen will be hereinafter also referred to as "fall notification screen"). In the present embodiment, a smartphone is used as the notification terminal 2. It should be noted that the notification terminal 2 does not need to be carried by the caregiver Ub. In such a case, it is possible to use, as a notification terminal 2, a desktop personal computer (PC) or a tablet PC, each of which is provided at, for example, a station of the caregiver Ub in the facility.

The management system S in accordance with the present embodiment is characterized by having not only the above-described function to notify the caregiver Ub of the excretion or fall of the care-receiver Ua but also the function to generate, storing, and allowing the viewing of history information which indicates the history of the location of the care-receiver Ua. A management method for achieving the latter function will be described later with reference to different drawings.

(Configuration of Management Device)

Figure 2:
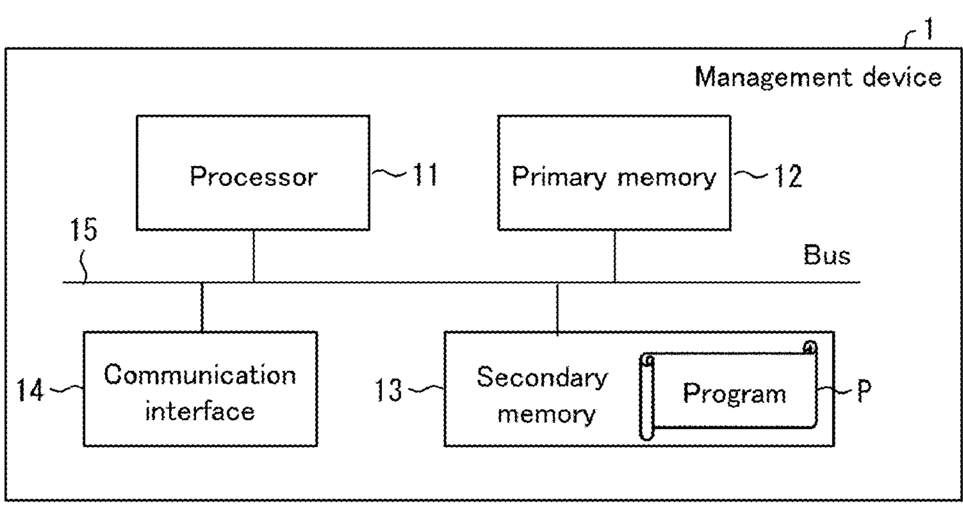
FIG. 2 is a block diagram illustrating a configuration of a management device included in the management system illustrated in FIG. 1.

The following description will discuss a configuration of the management device 1 with reference to FIG. 2. FIG. 2 is a block diagram illustrating the configuration of the management device 1.

As illustrated in FIG. 2, the management device 1 includes a processor 11, a primary memory 12, a secondary memory 13, a communication interface 14, and a bus 15. The processor 11, the primary memory 12, the secondary memory 13, and the communication interface 14 are connected with each other via the bus 15. Examples of a device usable as the management device 1 include a workstation constituting a cloud server.

The secondary memory 13 stores a notification program P. The processor 11 loads, on the primary memory 12, the notification program P stored in the secondary memory 13. The processor 11 then carries out processes included in management methods M1 and M2 (described later) in accordance with instructions included in the notification program P loaded on the primary memory 12. Examples of a device usable as the processor 11 include a central processing unit (CPU). Examples of a device usable as the primary memory 12 include a semiconductor random access memory (RAM). Examples of a device usable as the secondary memory 13 include a hard disk drive (HDD).

The communication interface 14 is an interface for communicating with the notification terminal 2 and the relay terminal 3 via the network 5. Examples of an interface usable as the communication interface 14 include an Ethernet (registered trademark) interface. Examples of a network which can be used include a personal area network (PAN), a local area network (LAN), a campus area network (CAN), a metropolitan area network (MAN), a wide area network (WAN), a global area network (GAN), and an internetwork containing a combination thereof. The internetwork may be an intranet, or may be an extranet, or may be the Internet.

It should be noted that the notification program P for causing the processor 11 to carry out the management methods M1 and M2 may be stored in a computer-readable non-transitory tangible storage medium. This storage medium can be the secondary memory 13 or another storage medium. For example, a tape, a disk, a card, a semiconductor memory, a programmable logic circuit, or the like can be used as said another storage medium.

The present embodiment employs a configuration in which a single processor (processor 11) is used to carry out the management methods M1 and M2. However, the present invention is not limited to this configuration. That is, a configuration in which a plurality of processors are used to carry out the management methods M1 and M2 can be alternatively employed. In such a case, the plurality of processors for carrying out the management methods M1 and M2 can be provided in a single computer and be configured to be communicable with each other via a bus or can be dispersedly provided in a plurality of computers and be configured to be communicable with each other via a network. For example, the following alternative aspects are also possible: an aspect in which processors included in the respective computers constituting a cloud server work together to carry out the management methods M1 and M2;

and an aspect in which the processor 11 of the management device 1 and a processor of the notification terminal 2 work together to carry out the management methods M1 and M2.

(Flow of Management Method)

Figure 3:
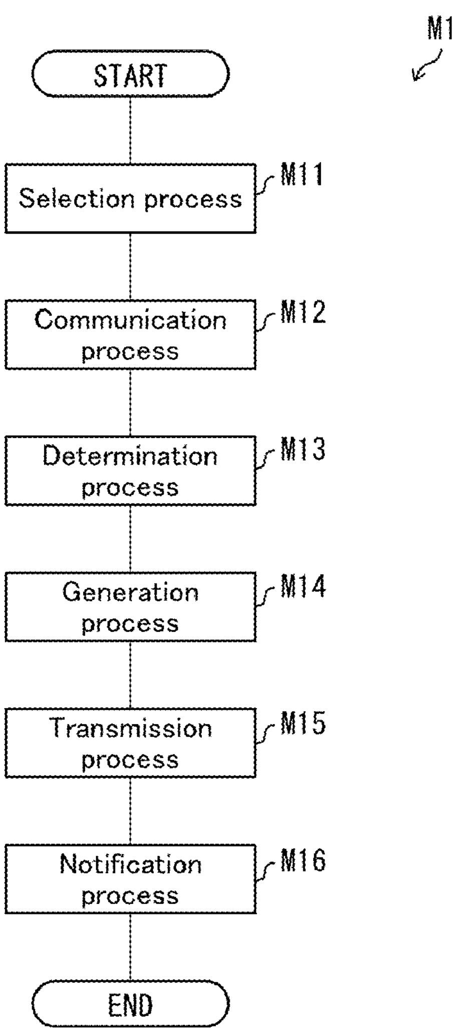
FIG. 3 is a flowchart illustrating a flow of a management method carried out in the management system.

The following description will discuss, with reference to FIG. 3, the management method M1 carried out by the management system S. FIG. 3 is a flowchart illustrating a flow of the management method M1.

As illustrated in FIG. 3, the management method M1 includes a selection process M11, a communication process M12, a determination process M13, a generation process M14, a transmission process M15, and a notification process M16. These processes are carried out each time the sensor terminal 4 detects that the care-receiver Ua has excreted or fallen. By repeating these processes, the management system S generates history information which indicates the location of the care-receiver Ua at a time point at which the sensor terminal 4 detected the excretion or fall.

The selection process M11 is a process in which the sensor terminal 4 selects a relay terminal 3. In the selection process M11, the sensor terminal 4 selects a relay terminal 3 which exists in the vicinity of the sensor terminal 4, for example, a relay terminal 3 which has the highest radio wave intensity.

The communication process M12 is a process in which the sensor terminal 4 and the management device 1 communicate with each other. In the communication process M12, the sensor terminal 4 and the management device 1 communicate with each other via the relay terminal 3 which was selected in the selection process M11. In the present embodiment, the communication in the communication process M12 is the transmission/reception of the above-described excretion detection signal or the transmission/reception of the above-described fall detection signal.

The determination process M13 is a process in which the management device 1 determines the location of the care-receiver Ua. In the determination process M13, the management device 1 determines the location of the care-receiver Ua on the basis of the relay terminal 3 which mediated the communication in the communication process M12. For example, when the relay terminal 3 which mediated the communication in the communication process M12 is provided in a dining room, the management device 1 determines that the location of the care-receiver Ua is the dining room. Alternatively, when the relay terminal 3 which mediated the communication in the communication process M12 is provided in a day room, the management device 1 determines that the location of the care-receiver Ua is the day room. When the above-described excretion detection signal is transmitted/received in the communication process M12, the location of the care-receiver Ua at a time point at which the excretion of the care-receiver Ua was detected is determined. When the above-described fall detection signal is transmitted/received in the communication process M12, the location of the care-receiver Ua at a time point at which the fall of the care-receiver Ua was detected is determined.

The generation process M14 is a process in which the management device 1 generates (updates) the history information. In the generation process M14, the management device 1 generates new history information by adding, to old history information, information which indicates the location of the care-receiver Ua determined in the determination process M13, while the information is associated with information which indicates the time at which the communication process M12 was carried out (i.e., time which matches the time at which the excretion or fall of the care-receiver Ua was detected). When the above-described excretion detection signal is transmitted/received in the communication process M12, the location of the care-receiver Ua at the time of the excretion is added to the history information. When the above-described fall detection signal is transmitted/received in the communication process M12, the location of the care-receiver Ua at the time of the fall is added to the history information.

In the history information, preferably, the location of the care-receiver Ua determined in the determination process M13 and identification information of the care-receiver Ua corresponding to the sensor terminal 4 are stored in association with each other. This makes it possible to manage the history of the location of each individual care-receiver Ua.

In the transmission process M15, the management device 1 transmits an alert to each notification terminal 2. When the above-described excretion detection signal is transmitted/received in the communication process M12, the management device 1 transmits the above-described excretion alert to each notification terminal 2. This excretion alert includes: the location of the care-receiver Ua determined in the determination process M13; and the time at which the communication process M12 was carried out (i.e., time which matches the time at which the excretion of the care-receiver Ua was detected). When the above-described fall detection signal is transmitted/received in the communication process M12, the management device 1 transmits the above-described fall alert to each notification terminal 2. This fall alert includes: the location of the care-receiver Ua determined in the determination process M13; and the time at which the communication process M12 was carried out (i.e., time which matches the time at which the fall of the care-receiver Ua was detected).

The notification process M16 is a process in which each notification terminal 2 that has received the alert displays a notification screen on a display. When the received alert is an excretion alert, each notification terminal 2 displays the above-described excretion notification screen on the display. This excretion notification screen includes: the location of the care-receiver Ua determined in the determination process M13; and the time at which the communication process M12 was carried out (i.e., time which matches the time at which the excretion of the care-receiver Ua was detected). When the received alert is a fall alert, each notification terminal 2 displays the above-described fall notification screen on the display. This fall notification screen includes: the location of the care-receiver Ua determined in the determination process M13; and the time at which the communication process M12 was carried out (i.e., time which matches the time at which the fall of the care-receiver Ua was detected).

The history information thus generated is stored in the management device 1. The caregiver Ub can use, for example the notification terminal 2 to view the history information. In such a case, the notification terminal 2 transmits a viewing request to the management device 1. The management device 1 receives the viewing request from the notification terminal 2, and then transmits history information to the notification terminal 2. The notification terminal 2 receives the history information from the management device 1, and then displays the history information on the display. The history information thus generated can be used by the management device 1 in order to analyze the correlation between the excretion and the location and the correlation between the fall and the location.

(Specific Example of Excretion Notification Screen)

Figure 4:
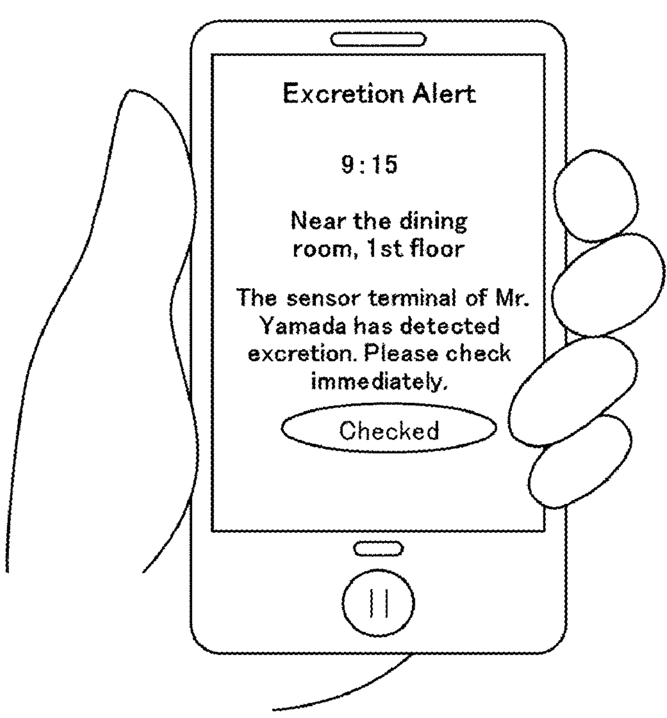
FIG. 4 is a view illustrating an example of an excretion notification screen displayed on a notification terminal in the management method illustrated in FIG. 3.

The following description will discuss a specific example of the excretion notification screen with reference to FIG. 4. FIG. 4 is a view illustrating a specific example of the excretion notification screen.

As illustrated in FIG. 4, the excretion notification screen displays the following information together with a message indicative of the detection of the excretion of the care-receiver Ua: the time at which the communication process M12 was carried out (i.e., time which matches the time at which the excretion of the care-receiver Ua was detected); and the location of the care-receiver Ua determined in the determination process M13. The excretion notification screen also displays a confirmation button. When the confirmation button is tapped by the caregiver Ub, the notification terminal 2 ends the notification process M16.

(Specific Example of Fall Notification Screen)

Figure 5:
FIG. 5 is a view illustrating an example of a fall notification screen displayed on the notification terminal in the management method illustrated in FIG. 3.

The following description will discuss a specific example of the fall notification screen with reference to FIG. 5. FIG. 5 is a view illustrating a specific example of the fall notification screen.

As illustrated in FIG. 5, the fall notification screen displays the following information together with a message indicative of the detection of the fall of the care-receiver Ua: the time at which the communication process M12 was carried out (i.e., time which matches the time at which the fall of the care-receiver Ua was detected); and the location of the care-receiver Ua determined in the determination process M13. The fall notification screen also displays a confirmation button. When the confirmation button is tapped by the caregiver Ub, the notification terminal 2 ends the notification process M16.

(Effects of Management System S)

As described above, the management system S carries out the management method M1 to generate history information which indicates the location of the care-receiver Ua at a time point at which the sensor terminal 4 detected the excretion or fall and to notify the caregiver Ub of the excretion or fall of the care-receiver Ua together with the information on the location. This allows the caregiver Ub to improve the efficiency of an operation based on the history information and/or to analyze the correlation between the excretion and the location or the correlation between the fall and the location in order to take necessary measures. In addition, the caregiver Ub can immediately attend and take necessary measures when the care-receiver Ua has excreted or fallen.

(Additional Functions)

The management system S in accordance with the present embodiment can be further equipped with a function to notify the caregiver Ub when the care-receiver Ua has attempted to go out of the facility and/or a function to generate history information indicative of the history of the location of the care-receiver Ua even when the excretion or fall is not detected.

Figure 6:
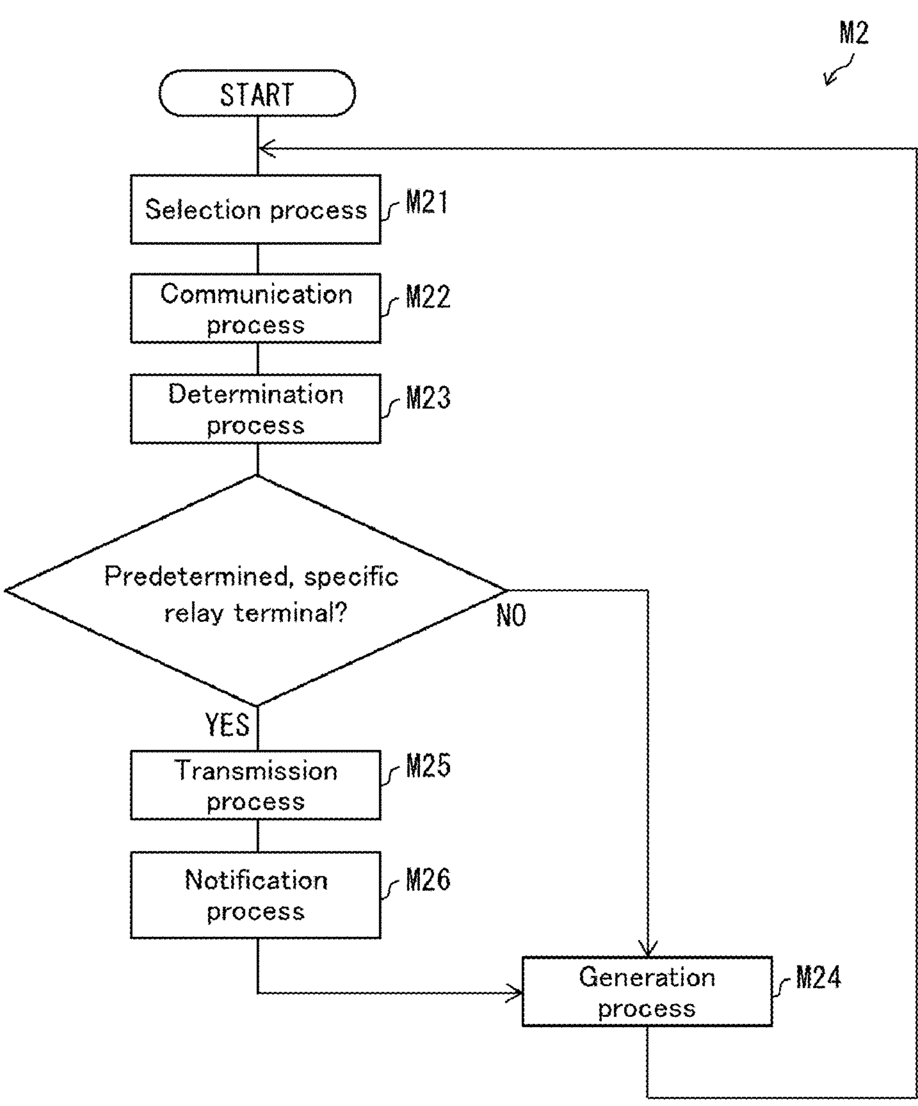
FIG. 6 is a flowchart illustrating a variation of the management method illustrated in FIG. 3.

The following description will discuss, with reference to FIG. 6, a management method carried out by the management system S in order to perform the above-described functions (this method will be hereinafter referred to as "management method M2"). FIG. 6 is a flowchart illustrating a flow of the management method M2.

As illustrated in FIG. 6, the management method M2 includes a selection process M21, a communication process M22, a determination process M23, a generation process M24, a transmission process M25, and a notification process M26. These processes are carried out periodically (e.g., every minute). By repeating these processes, the management system S generates history information which indicates the location of the care-receiver Ua.

The selection process M21 is a process in which the sensor terminal 4 selects a relay terminal 3. In the selection process M21, the sensor terminal 4 selects a relay terminal 3 which exists in the vicinity of the sensor terminal 4, for example, a relay terminal 3 which has the highest radio wave intensity.

The communication process M22 is a process in which the sensor terminal 4 and the management device 1 communicate with each other. In the communication process M22, the sensor terminal 4 and the management device 1 communicate with each other via the relay terminal 3 which was selected in the selection process M21. In the present embodiment, the communication in the communication process M22 is the transmission/reception of the above-described generation instruction signal.

The determination process M23 is a process in which the management device 1 determines the location of the care-receiver Ua. In the determination process M23, the management device 1 determines the location of the care-receiver Ua on the basis of the relay terminal 3 which mediated the communication in the communication process M22. For example, when the relay terminal 3 which mediated the communication in the communication process M22 is provided in the dining room, the management device 1 determines that the location of the care-receiver Ua at a time point at which the sensor terminal 4 transmitted the generation instruction signal is the dining room.

The generation process M24 is a process in which the management device 1 generates (updates) the history information. In the generation process M24, the management device 1 generates new history information by adding, to old history information, information which indicates the location of the care-receiver Ua determined in the determination process M23, while the information is associated with information which indicates the time at which the communication process M22 was carried out (i.e., time which matches the time at which the sensor terminal 4 transmitted the generation instruction signal).

In the history information, preferably, the location of the care-receiver Ua determined in the determination process M23 and identification information of the care-receiver Ua corresponding to the sensor terminal 4 are stored in association with each other. This makes it possible to manage the history of the location of each individual care-receiver Ua.

The generation process M24 can be carried out only when the location of the care-receiver Ua determined in the determination process M23 differs from that in the history information which was previously generated.

The transmission process M25 and the notification process M26 are carried out when the relay terminal 3 which mediated the communication in the communication process M22 is a predetermined, specific relay terminal. In the present embodiment, the specific relay terminal 3 is a relay terminal 3 which is provided at an entrance/exit of the facility. That is, the transmission process M25 and the notification process M26 are carried out when the care-receiver Ua is present in the vicinity of the entrance/exit of the facility.

The transmission process M25 is a process in which the management device 1 transmits, to each notification terminal 2, an alert for notifying the caregiver Ub that the management device 1 has detected the departure of the care-receiver Ua (this alert will be hereinafter also referred to as "departure alert"). The departure alert includes: the location of the care-receiver Ua determined in the determination process M23; and the time at which the communication process M22 was carried out (i.e., time which matches the time at which the departure of the care-receiver Ua was detected).

The notification process M26 is a process in which each notification terminal 2 that has received the departure alert displays, on the display, a notification screen for notifying the caregiver Ub that the departure of the care-receiver Ua has been detected (this screen will be hereinafter also referred to as "departure notification screen"). The departure notification screen includes: the location of the care-receiver Ua determined in the determination process M23; and the time at which the communication process M22 was carried out (i.e., time which matches the time at which the departure of the care-receiver Ua was detected).

The history information thus generated is stored in the management device 1. The caregiver Ub can use, for example the notification terminal 2 to view the history information. In such a case, the notification terminal 2 transmits a viewing request to the management device 1. The management device 1 receives the viewing request from the notification terminal 2, and then transmits history information to the notification terminal 2. The notification terminal 2 receives the history information from the management device 1, and then displays the history information on the display.

(Specific Example of Departure Notification Screen)

Figure 7:
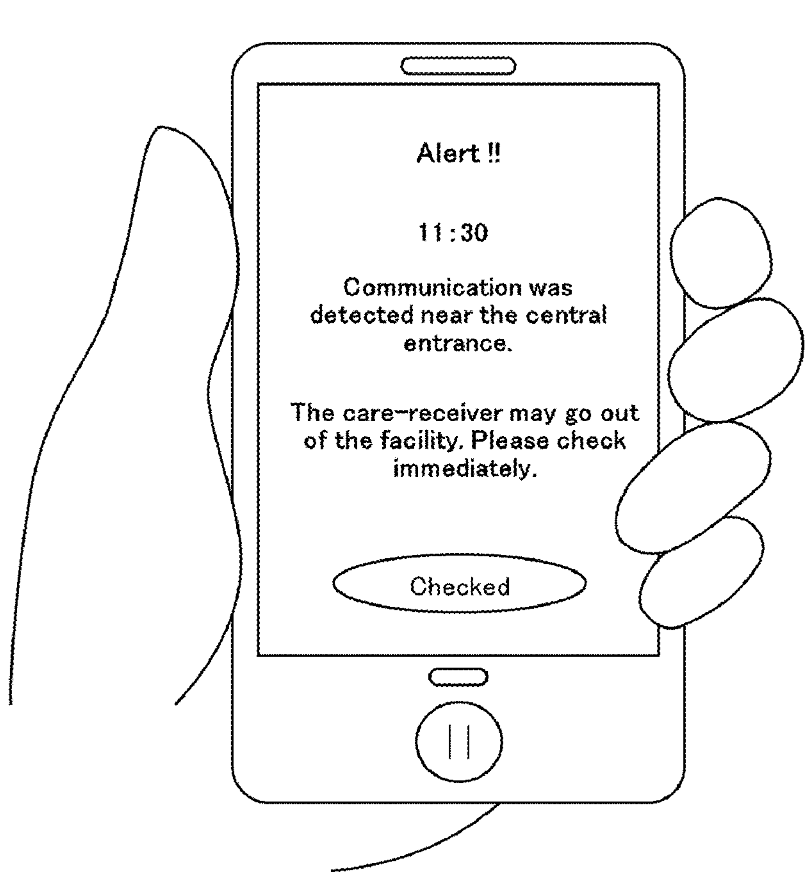
FIG. 7 is a view illustrating an example of a departure notification screen displayed on the notification terminal in the management method illustrated in FIG. 3.

The following description will discuss a specific example of the departure notification screen with reference to FIG. 7. FIG. 7 is a view illustrating a specific example of the departure notification screen.

As illustrated in FIG. 7, the departure notification screen displays the following information together with a message indicative of the detection of the departure of the care-receiver Ua: the time at which the communication process M22 was carried out (i.e., time which matches the time at which the departure of the care-receiver Ua was detected); and the location of the care-receiver Ua determined in the determination process M23. The departure notification screen also displays a confirmation button. When the confirmation button is tapped by the caregiver Ub, the notification terminal 2 ends the notification process M26.

(Effects of Additional Functions)

By the function to notify the caregiver Ub when the care-receiver Ua attempts to go out of the facility, the caregiver Ub can attend to the care-receiver Ua on the basis of the notification indicative of the location of the care-receiver Ua. This allows the caregiver Ub to prevent unintended departure of the care-receiver Ua. In addition, by the function to generate history information indicative of the location of the care-receiver Ua even when the excretion or fall is not detected, it is possible to ascertain a behavioral pattern of the care-receiver Ua other than the time of excretion or fall.

(Recap)

A management device in accordance with Aspect 1 of the present embodiment includes at least one processor that carries out a communication process of performing communication, via any of a plurality of relay terminals, with a sensor terminal which is worn by a care-receiver and which includes an excretion sensor and a determination process of determining a location of the care-receiver, based on a relay terminal which mediated the communication with the sensor terminal in the communication process.

With the above configuration, it is possible to determine the location of a care-receiver on the basis of a relay terminal that mediates the communication between a management device and a sensor terminal on which a positioning device such as a GPS device is not mounted and which is applied to the detection of excretion.

In Aspect 2 of the present embodiment, the management device in accordance with Aspect 1 is configured such that in the determination process, the at least one processor determines a location of the care-receiver at a time point at which the sensor terminal detected excretion by the care-receiver, based on a relay terminal which mediated the communication with the sensor terminal in the communication process being carried out at the time point.

With the above configuration, it is possible to determine the location of a care-receiver who needs excretion care. This allows a caregiver to efficiently perform excretion care.

In Aspect 3 of the present embodiment, the management device in accordance with Aspect 1 or 2 is configured such that the at least one processor further carries out a generation process of generating history information which indicates history of the location of the care-receiver determined in the determination process.

With the above configuration, it is possible to generate history information which indicates the history of the location of a care-receiver. This makes it possible to ascertain, based on the generated history information, a behavioral pattern corresponding to the location of the care-receiver.

In Aspect 4 of the present embodiment, the management device in accordance with any one of Aspects 1 through 3 is configured such that in the generation process, the at least one processor stores the history information in association with identification information of the care-receiver corresponding to the sensor terminal.

With the above configuration, it is possible to store history information which indicates the history of the location of each individual care-receiver. This makes it possible to ascertain, based on the stored history information, a behavioral pattern corresponding to the location of the care-receiver.

In Aspect 5 of the present embodiment, the management device in accordance with any one of Aspects 1 through 4 is configured such that when the communication with the sensor terminal has been mediated by a predetermined relay terminal among the plurality of relay terminals in the communication process, the at least one processor transmits an alert to a notification terminal.

With the above configuration, it is possible to notify a caregiver that a care-receiver is located at a place where a predetermined relay terminal is provided. This makes it possible to use the management device for other purposes such as preventing care-receivers from entering dangerous places.

In Aspect 6 of the present embodiment, the management device in accordance with any one of Aspects 1 through 5 is configured such that: the sensor terminal includes an acceleration sensor; and when the sensor terminal has detected, based on the acceleration sensor, that the care-receiver has fallen, the at least one processor sends an alert to a notification terminal.

With the above configuration, it is possible to notify a caregiver of the fall of a care-receiver and of the location of the care-receiver who has fallen. This allows the caregiver to immediately attend to the care-receiver and take necessary measures.

A management method in accordance with Aspect 7 of the present embodiment includes: a communication process of performing, by at least one processor, communication, via any of a plurality of relay terminals, with a sensor terminal which is worn by a care-receiver and which includes an excretion sensor; and a determination process of determining, by the at least one processor, a location of the care-receiver, based on a relay terminal which mediated the communication with the sensor terminal in the communication process.

With the above configuration, it is possible to bring about effects similar to those of Aspect 1.

ADDITIONAL REMARKS

The present invention is not limited to the embodiments, but can be altered by a person skilled in the art within the scope of the claims. The present invention also encompasses, in its technical scope, any embodiment derived by combining technical means disclosed in differing embodiments.

The invention claimed is:

1. A management device comprising at least one processor that carries out:

a communication process of performing communication, via any of a plurality of relay terminals, with a sensor terminal which is worn by a care-receiver and which includes an excretion sensor; and a determination process of determining a location of the care-receiver, based on one of the plurality of the relay terminals which was selected by the sensor terminal and mediated the communication with the sensor terminal in the communication process.

2. The management device according to claim 1, wherein in the determination process, the at least one processor determines the location of the care-receiver at a time point at which the sensor terminal detected excretion by the care-receiver, based on relay terminals in the communication process being carried out at the time point.

3. The management device according to claim 1, wherein the at least one processor further carries out a generation process of generating history information which indicates history of the location of the care-receiver determined in the determination process.

4. The management device according to claim 3, wherein in the generation process, the at least one processor stores the history information in association with identification information of the care-receiver corresponding to the sensor terminal.

5. The management device according to claim 1, wherein, when the communication with the sensor terminal has been mediated by the one of the plurality of the relay terminals in the communication process, the at least one processor transmits an alert to a notification terminal.

6. The management device according to claim 1, wherein:

the sensor terminal includes an acceleration sensor; and when the sensor terminal has detected, based on the acceleration sensor, that the care-receiver has fallen, the at least one processor sends an alert to a notification terminal.

7. A management method comprising:

a communication process of performing, by at least one processor, communication, via any of a plurality of relay terminals, with a sensor terminal which is worn by a care-receiver and which includes an excretion sensor; and a determination process of determining, by the at least one processor, a location of the care-receiver, based on one of the plurality of the relay terminals which was selected by the sensor terminal and mediated the communication with the sensor terminal in the communication process.

8. A management system, comprising:

at least one processor;

a plurality of relay terminals; and a sensor terminal which includes an excretion sensor, the sensor terminal being worn by a care-receiver, wherein the at least one processor is configured to carry out:

a communication process of performing communication with the sensor terminal via one of the plurality of the relay terminals selected by the sensor terminal, the one of the plurality of the relay terminals mediating the communication with the sensor terminal; and a determination process of determining a location of the care-receiver based on the one of the plurality of the relay terminals.

* * * * *